US012767809B2

(12) United States Patent
Wang et al.

(10) Patent No.: US 12,767,809 B2
(45) Date of Patent: Oct. 20, 2026

(54) MODIFIER AND PREPARATION METHOD THEREOF, AND MODIFIED ACRYLIC RESIN AND PREPARATION METHOD AND USE THEREOF

(71) Applicant: Qihe Leahou Chemical Co., Ltd., Dezhou (CN)

(72) Inventors: Shunping Wang, Dezhou (CN); Shuguang Qu, Dezhou (CN); Lianxiang Feng, Dezhou (CN)

(73) Assignee: Qihe Leahou Chemical Co., Ltd., Dezhou (CN)

( * ) Notice: Subject to any disclaimer, the term of this patent is extended or adjusted under 35 U.S.C. 154(b) by 565 days.

(21) Appl. No.: 18/240,725

(22) Filed: Aug. 31, 2023

(65) Prior Publication Data

US 2024/0093019 A1 Mar. 21, 2024

(30) Foreign Application Priority Data

Sep. 2, 2022 (CN) ........................ 202211074746.8

(51) Int. Cl.
*C08L 33/02* (2006.01)
*C08F 22/02* (2006.01)

(52) U.S. Cl.
CPC .............. *C08L 33/02* (2013.01); *C08F 22/02* (2013.01)

(58) Field of Classification Search
None
See application file for complete search history.

(56) References Cited

FOREIGN PATENT DOCUMENTS

| | | | | |
|---|---|---|---|---|
| CN | 102120788 A | * | 7/2011 | |
| CN | 106188412 A | * | 12/2016 | .............. C09D 4/06 |
| CN | 112679650 A | * | 4/2021 | |

OTHER PUBLICATIONS

CN-112679650-A, 2021, machine translation (Year: 2021).*
CN-102120788-A, 2011, machine translation (Year: 2011).*
CN 106188412 A, machine translation, 2016 (Year: 2016).*

* cited by examiner

*Primary Examiner* — Satya B Sastri
(74) *Attorney, Agent, or Firm* — Fish IP Law, LLP

(57) ABSTRACT

The present disclosure provides a modifier and a preparation method thereof, and a modified acrylic resin and a preparation method and use thereof, and relates to the technical field of leather auxiliaries. In the present disclosure, the modifier includes an acylate and/or a hyperbranched esterified polymer; where raw materials of the acylate include a first hydroxyl organic amine and maleic anhydride; and raw materials of the hyperbranched esterified polymer include a second hydroxyl organic amine, the maleic anhydride, and an acidic catalyst. The modifier has multiple reactive functional groups such as a hydroxyl group, a carboxyl group, and a double bond. During the preparation of the modified acrylic resin with the modifier, the reactive functional groups in the modifier are copolymerized with a vinyl group of acrylic acid, thereby increasing degrees of branching and crosslinking of the modified acrylic resin.

9 Claims, No Drawings

MODIFIER AND PREPARATION METHOD THEREOF, AND MODIFIED ACRYLIC RESIN AND PREPARATION METHOD AND USE THEREOF

CROSS REFERENCE TO RELATED APPLICATION

This patent application claims the benefit and priority of Chinese Patent Application No. 202211074746.8, filed with the China National Intellectual Property Administration on Sep. 2, 2022, the disclosure of which is incorporated by reference herein in its entirety as part of the present application.

TECHNICAL FIELD

The present disclosure relates to the technical field of leather auxiliaries, in particular to a modifier and a preparation method thereof, and a modified acrylic resin and a preparation method and use thereof.

BACKGROUND

Acrylic resin has desirable light resistance and is widely used in coatings, printing inks, textile printing and dyeing, papermaking, and leather industries. In the leather industry, the acrylic resin is generally used as a retanning agent. The retanning agent shows an important influence on the performance, quality, and grade of finished leather. Different retanning agents can impart different styles to the leather. Acrylic retanning agents can form better cross-linking with leather, and endow leather with excellent filling and fullness, such that these retanning agents are widely used. However, the leather exhibits poor tear resistance after being treated with existing acrylic resin-based retanning agents.

SUMMARY

In view of this, an objective of the present disclosure is to provide a modifier and a preparation method thereof, and a modified acrylic resin and a preparation method and use thereof. In the present disclosure, the modified acrylic resin modified by the modifier can improve the tear resistance of a leather.

To achieve the above objective, the present disclosure provides the following technical solutions:

The present disclosure provides a modifier, including an acylate and/or a hyperbranched esterified polymer; where raw materials of the acylate include a first hydroxyl organic amine and maleic anhydride; and raw materials of the hyperbranched esterified polymer include a second hydroxyl organic amine, the maleic anhydride, and an acidic catalyst.

Preferably, the first hydroxyl organic amine and the second hydroxyl organic amine independently are one or more selected from the group consisting of N-(2-hydroxyethyl)ethylenediamine, N,N-bis(2-hydroxyethyl)ethylenediamine, N,N'-bis(2-hydroxyethyl)ethylenediamine, and N,N,NR'-tetrahydroxyethylethylenediamine Preferably, the acidic catalyst is one or more selected from the group consisting of p-toluenesulfonic acid, concentrated sulfuric acid, and a solid acid; and the solid acid is one or more selected from the group consisting of an immobilized liquid acid, an acidic oxide, a transition metal sulfide, a phosphate, a sulfate, a zeolite molecular sieve, a heteropolyacid, a cation exchange resin, a natural clay mineral, and a solid superacid.

The present disclosure further provides a preparation method of the modifier, where a preparation process of the acylate includes the following steps:

mixing the first hydroxyl organic amine with the maleic anhydride to allow first acylation to obtain the acylate; and a preparation process of the hyperbranched esterified polymer includes the following steps:

subjecting the second hydroxyl organic amine and the maleic anhydride to second acylation to obtain the acylate; and mixing the acylate with the acidic catalyst to allow esterification to obtain the hyperbranched esterified polymer.

Preferably, the first acylation and the second acylation independently are conducted at 40° C. to 90° C. for 1 h to 8 h.

Preferably, the esterification is conducted at 100° C. to 150° C. for 2 h to 5 h.

The present disclosure further provides a modified acrylic resin, including the following raw materials in parts by mass: 100 parts of acrylic acid, 5 parts to 60 parts of a modifier, 1 part to 30 parts of a crosslinking agent, 1 part to 30 parts of an initiator, and 200 parts to 600 parts of water; where the modifier is the modifier described above or a modifier prepared by the preparation method described above.

The present disclosure further provides a preparation method of the modified acrylic resin, including the following steps:

mixing the water, the modifier, the acrylic acid, the crosslinking agent, and the initiator to allow polymerization to obtain the modified acrylic resin.

Preferably, the polymerization is conducted at 80° C. to 90° C. for 2 h to 10 h.

The present disclosure further provides use of the modified acrylic resin or a modified acrylic resin prepared by the preparation method as a retanning agent.

The present disclosure provides a modifier, including an acylate and/or a hyperbranched esterified polymer; where raw materials of the acylate include a first hydroxyl organic amine and maleic anhydride; and raw materials of the hyperbranched esterified polymer include a second hydroxyl organic amine, the maleic anhydride, and an acidic catalyst. The maleic anhydride is a carboxyl-containing anionic vinyl monomer. In the present disclosure, amidation is conducted with the maleic anhydride and the hydroxyl organic amine to introduce amine groups into the vinyl monomer. This imparts amphoteric properties of anions and cations to the acylate as well as to the hyperbranched esterified polymer. The modifier and the hyperbranched esterified polymer each have multiple reactive functional groups such as a hydroxyl group, a carboxyl group, and a double bond. During the preparation of the modified acrylic resin with the modifier and/or hyperbranched esterified polymer, the reactive functional groups in the modifier are copolymerized with a vinyl group of acrylic acid, thereby increasing degrees of branching and crosslinking of the modified acrylic resin. The modified acrylic resin can be applied to a leather, and a modified acrylic resin film formed on a surface of the leather shows a high flexibility, thereby significantly improving tear resistance, pressure resistance, and resilience of the leather.

The present disclosure further provides a preparation method of the modifier. In the present disclosure, the preparation method has a simple operation, cheap and easy-to-obtain raw materials, and a low production cost, and is suitable for industrial production.

The present disclosure further provides a modified acrylic resin, including the following raw materials in parts by mass: 100 parts of acrylic acid, 5 parts to 60 parts of a modifier, 1 part to 30 parts of a crosslinking agent, 1 part to 30 parts of an initiator, and 200 parts to 600 parts of water; where the modifier is the modifier described above or a modifier prepared by the preparation method described above. An acrylic resin film formed by traditional acrylic resin-based retanning agents (such as LEATAN AR) on a leather surface is brittle, and leads to poor tear resistance of the leather, hard leather board, coarse grain side, poor elasticity after embossing, and low pressure resistance. Moreover, this type of retanning agent causes a certain discoloration effect on the coloring of anionic dyes, resulting in low dyeing brightness. However, in the modified acrylic resin provided by the present disclosure, the modifier has multiple active functional groups. The polymerization of the modifier, acrylic acid, and crosslinking agent can significantly increase degrees of branching and crosslinking of the acrylic resin. The modified acrylic resin can form a highly-flexible modified acrylic resin film on the leather surface, and the film significantly improves the tear resistance, pressure resistance, and resilience of the leather, thereby improving comprehensive mechanical properties of the leather. Moreover, since the acylate and/or hyperbranched esterified polymer is used as the modifier in the present disclosure, more amine groups are introduced into an acrylic resin polymer. In this way, the polymer is cationic, and avoids the discoloration effect caused by pure acrylic acid polymer having too many carboxyl groups and strong anionic property during dyeing, such that the leather has high dyeing vividness and fine grain side.

The present disclosure further provides a preparation method of the modified acrylic resin. In the present disclosure, the preparation method has a simple operation, cheap and easy-to-obtain raw materials, and a low production cost, and is suitable for industrial production.

DETAILED DESCRIPTION OF THE EMBODIMENTS

The present disclosure provides a modifier, including an acylate and/or a hyperbranched esterified polymer; where raw materials of the acylate include a first hydroxyl organic amine and maleic anhydride; and raw materials of the hyperbranched esterified polymer include a second hydroxyl organic amine, the maleic anhydride, and an acidic catalyst.

In the present disclosure, unless otherwise specified, all raw material components are commercially available products well known to persons skilled in the art.

In the present disclosure, the first hydroxyl organic amine and the second hydroxyl organic amine independently are preferably one or more selected from the group consisting of N-(2-hydroxyethyl)ethylenediamine, N,N-bis(2-hydroxyethyl)ethylenediamine, N,N'-bis(2-hydroxyethyl)ethylenediamine, and N,N,NR'-tetrahydroxyethylethylenediamine. The first hydroxyl organic amine and the maleic anhydride are at a molar ratio of preferably 1:(1-2), more preferably 1:(1.2-1.8), and even more preferably 1:(1.4-1.6). The second hydroxyl organic amine and the maleic anhydride are at a molar ratio of preferably 1:(1-2), more preferably 1:(1.2-1.8), and even more preferably 1:(1.4-1.6).

In the present disclosure, the acidic catalyst is one or more selected from the group consisting of p-toluenesulfonic acid, concentrated sulfuric acid, and a solid acid. The concentrated sulfuric acid has a concentration of preferably greater than or equal to 98 wt %. The solid acid is preferably one or more selected from the group consisting of an immobilized liquid acid, an acidic oxide, a transition metal sulfide, a phosphate, a sulfate, a zeolite molecular sieve, a heteropolyacid, a cation exchange resin, a natural clay mineral, and a solid superacid. The immobilized liquid acid preferably includes one or more of $HF/Al_2O_3$, $BF_3/Al_2O_3$, and $H_3PO_4$/diatomaceous earth. The acidic oxide preferably includes one or more of $Al_2O_3$, $SiO_2$, $B_2O_3$, $Nb_2O_5$, $Al_2O_3$—$SiO_2$, and $Al_2O_3$—$B_2O_3$. The transition metal sulfide preferably includes one or two of CdS and ZnS. The phosphate preferably includes one or two of $AlPO_4$ and $BPO_4$. The sulfate preferably includes one or more of $Fe_2(SO_4)_3$, $Al_2(SO_4)_3$, and $CuSO_4$. The zeolite molecular sieve preferably includes one or more of ZSM-5 zeolite, X zeolite, Y zeolite, B zeolite, mordenite, and an AIRO SAPO molecular sieve. The heteropolyacid preferably includes one or more of $H_3PW_{12}O_{40}$, $H_4SiW_{12}O_{40}$, and $H_3PM_{O12}O_{40}$. The cation exchange resin preferably includes one or two of a styrene-divinylbenzene copolymer and Nafion-H. The natural clay mineral preferably includes one or more of kaolin, bentonite, and montmorillonite. The solid superacid preferably includes one or more of $SO_4^{2-}/ZrO_2$, $WO_3/ZrO_2$, $MoO_3/ZrO_2$, and $B_2O_3/ZrO_2$. The hydroxyl organic amine and the acidic catalyst are at a mass ratio of preferably 1:(0.005-0.1), more preferably 1:(0.01-0.08), and even more preferably 1:(0.02-0.05).

The present disclosure further provides a preparation method of the modifier, where a preparation process of the acylate includes the following steps: mixing the first hydroxyl organic amine with the maleic anhydride to allow first acylation to obtain the acylate.

In the present disclosure, the mixing preferably includes: adding the maleic anhydride dropwise into the first hydroxyl organic amine; there is no special limitation on a mixing method, as long as the raw materials can be mixed uniformly, such as stirring. The first hydroxyl organic amine is preferably added in batches, more preferably in 2 to 15 times, more preferably in 4 to 12 times. The first acylation is conducted at preferably 40° C. to 90° C., more preferably 45° C. to 80° C., and even more preferably 45° C. to 70° C. for preferably 1 h to 8 h, more preferably 2 h to 7 h, more preferably 3 h to 6 h.

In the present disclosure, a product obtained from the first acylation includes at least one of the structures shown in formulas I-1 to I-6, as shown in Table 1.

TABLE 1

| Compounds with structures shown in formulas I-1 to I-6 | |
|---|---|
| I-1 | 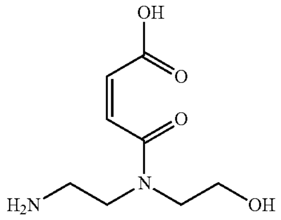 [SMILES: NCCN(CCO)C(=O)/C=C\C(=O)O] |

TABLE 1-continued

| Compounds with structures shown in formulas I-1 to I-6 | |
|---|---|
| I-2 | 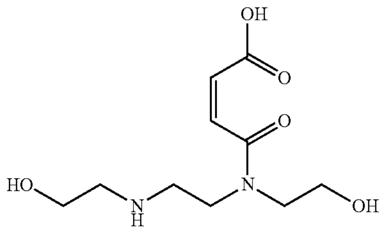 [SMILES: O=C(O)/C=C\C(=O)N(CCO)CCNCCO] |
| I-3 | 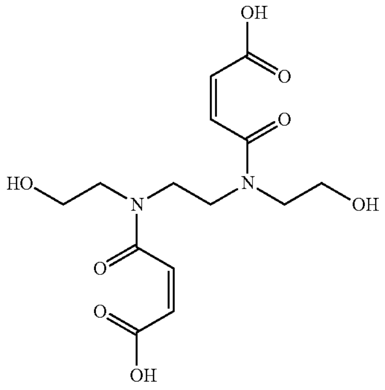 [SMILES: O=C(O)/C=C\C(=O)N(CCO)CCN(CCO)C(=O)/C=C\C(=O)O] |
| I-4 | 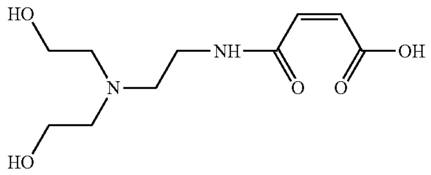 [SMILES: O=C(O)/C=C\C(=O)NCCN(CCO)CCO] |
| I-5 | 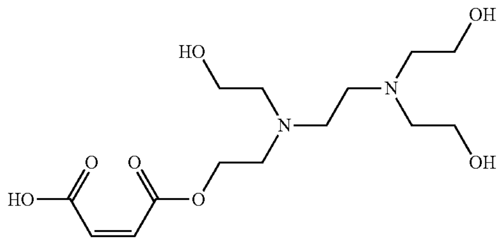 [SMILES: O=C(O)/C=C\C(=O)OCCN(CCO)CCN(CCO)CCO] |
| I-6 | 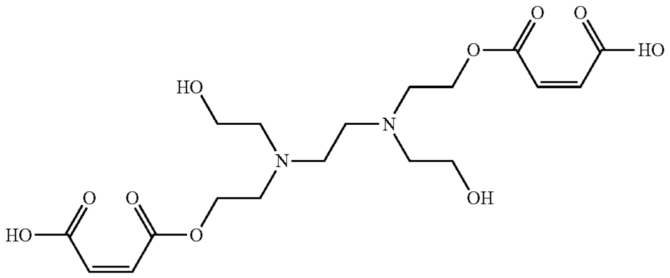 [SMILES: O=C(O)/C=C\C(=O)OCCN(CCO)CCN(CCO)CCOC(=O)/C=C\C(=O)O] |

In the present disclosure, a preparation process of the hyperbranched esterified polymer includes the following steps: subjecting the second hydroxyl organic amine and the maleic anhydride to second acylation to obtain the acylate (namely the acylate described above); and mixing the acylate with the acidic catalyst to allow esterification to obtain the hyperbranched esterified polymer.

In the present disclosure, conditions of the second acylation are preferably the same as those of the first acylation, and will not be repeated here.

In the present disclosure, there is no special limitation on a mixing method of the acylate and the acidic catalyst, as long as the raw materials can be mixed evenly, such as stirring. The esterification is conducted at preferably 100° C. to 150° C., more preferably 110° C. to 140° C., and even more preferably 120° C. to 130° C. for preferably 2 h to 5 h, more preferably 2.5 h to 4.5 h, and even more preferably 3 h to 4 h. During the esterification, the second hydroxyl organic amine is subjected to acylation with the maleic anhydride to generate an acylate, and the acylate is subjected to esterification under an action of the acidic catalyst to form the hyperbranched esterified polymer. After the esterification is completed, a resulting esterification reaction system is preferably cooled to 80° C. to 90° C. (more preferably 82° C. to 88° C., and even more preferably 85° C. to 86° C.); there is no special limitation on a cooling method, and a cooling method known to those skilled in the art can be used, such as natural cooling.

The present disclosure further provides a modified acrylic resin, including the following raw materials in parts by mass: 100 parts of acrylic acid, 5 parts to 60 parts of a modifier, 1 part to 30 parts of a crosslinking agent, 1 part to 30 parts of an initiator, and 200 parts to 600 parts of water; where the modifier is the modifier described above or a modifier prepared by the preparation method described above.

In the present disclosure, the modified acrylic resin includes 100 parts of the acrylic acid in parts by mass.

In the present disclosure, the modified acrylic resin includes 5 parts to 60 parts, preferably 10 parts to 50 parts, and even more preferably 20 parts to 40 parts of the modifier in parts by mass of the acrylic acid; the modifier is the modifier described above or a modifier prepared by the preparation method described above.

In the present disclosure, the modified acrylic resin includes 1 part to 30 parts, preferably 5 parts to 25 parts, even more preferably 10 parts to 20 parts, and most preferably 15 parts of the crosslinking agent in parts by mass of the acrylic acid. The crosslinking agent preferably includes trimethylolpropane trimethacrylate and/or N,N'-methylenebisacrylamide.

In the present disclosure, the modified acrylic resin includes 1 part to 30 parts, preferably 5 parts to 25 parts, even more preferably 10 parts to 20 parts, and most preferably 15 parts of the initiator in parts by mass of the acrylic acid. The initiator preferably includes one or more of potassium persulfate, sodium persulfate, ammonium persulfate, and hydrogen peroxide. The initiator is preferably used in the form of an aqueous initiator solution, and the aqueous initiator solution has a concentration of preferably 10 wt % to 50 wt %, more preferably 20 wt % to 30 wt %.

In the present disclosure, the modified acrylic resin includes 200 parts to 600 parts, preferably 250 parts to 550 parts, more preferably 300 parts to 500 parts, and even more preferably 350 parts to 450 parts of the water in parts by mass of the acrylic acid. The water is preferably distilled water and/or deionized water.

The present disclosure further provides a preparation method of the modified acrylic resin, including the following steps: mixing the water, the modifier, the acrylic acid, the crosslinking agent, and the initiator to allow polymerization to obtain the modified acrylic resin.

In the present disclosure, the mixing is conducted at preferably 80° C. to 90° C., more preferably 82° C. to 88° C., and even more preferably 85° C. to 86° C. In a specific example, the mixing preferably includes: mixing the modifier with the water to obtain a modifier solution; mixing the acrylic acid and the crosslinking agent to obtain an acrylic acid-crosslinking agent mixture; and adding the acrylic acid-crosslinking agent mixture and the aqueous initiator solution simultaneously dropwise into the modifier solution to allow mixing. The addition dropwise is conducted for preferably 2 h to 6 h, more preferably 3 h to 5 h.

In the present disclosure, the polymerization is conducted at preferably 80° C. to 90° C., more preferably 82° C. to 88° C., and even more preferably 85° C. to 86° C. for preferably 2 h to 10 h, more preferably 2.5 h to 8 h, and even more preferably 3 h to 4 h.

In the present disclosure, after the polymerization is completed, an obtained polymerization reaction solution is preferably cooled to 30° C. to 60° C. (more preferably 40° C. to 50° C.); there is no special limitation on a cooling method, and a cooling method known to those skilled in the art can be used, such as natural cooling.

The present disclosure further provides use of the modified acrylic resin or a modified acrylic resin prepared by the preparation method as a retanning agent. In the present disclosure, the modified acrylic resin is preferably used as a retanning agent.

The technical solutions of the present disclosure will be clearly and completely described below with reference to the examples of the present disclosure. Apparently, the described examples are merely a part rather than all of the examples of the present disclosure. All other embodiments obtained by those skilled in the art based on the embodiments of the present disclosure without creative efforts shall fall within the protection scope of the present disclosure.

Example 1

2 mol of maleic anhydride was slowly added in 1 mol of N,N,N', N'-tetrahydroxyethylethylenediamine in 12 batches, mixed well by stirring, and then subjected to acylation at 58° C. for 4 h to obtain a modifier (an acylation product was shown in formula 1-6).

200 kg of distilled water and 20 kg of the modifier were added to a reaction device, and heated to 85° C. to obtain a modifier solution;

100 kg of acrylic acid and 5 kg of trimethylolpropane trimethacrylate were uniformly mixed by stirring, and a resulting acrylic acid-crosslinking agent mixture was added into a head tank 1;

5 kg of a sodium persulfate aqueous solution with a concentration of 20 wt % was added to a head tank 2; and the acrylic acid-crosslinking agent mixture in the head tank 1 and the sodium persulfate aqueous solution in the head tank 2 were added dropwise into the modifier solution within 4 h at the same time, polymerization was conducted for 2 h, and a resulting product was cooled to 40° C. to obtain a modified acrylic resin.

Example 2

1 mol of maleic anhydride was slowly added in 1 mol of N-(2-hydroxyethyl)ethylenediamine in 4 batches, mixed well by stirring, subjected to acylation at 45° C. for 4 h to obtain a modifier (an acylation product was shown in formula 1-1);

30 kg of the acylate was added to a reaction device, 0.4 kg of p-toluenesulfonic acid was added and mixed evenly by stirring, and heated to 120° C. to allow esterification for 3 h to obtain a hyperbranched esterified polymer (an esterification product was shown in II-1);

the hyperbranched esterified polymer was cooled to 90° C., and 300 kg of distilled water was added to obtain a modifier solution; 100 kg of acrylic acid and 2 kg of N,N'-methylene bisacrylamide were uniformly mixed by stirring, and a resulting acrylic acid-crosslinking agent mixture was added into a head tank 1;

10 kg of a hydrogen peroxide aqueous solution with a concentration of 20 wt % was added to a head tank 2; and the acrylic acid-crosslinking agent mixture in the head tank 1 and the sodium persulfate aqueous solution in the head tank 2 were added dropwise into the modifier solution within 3 h at the same time, polymerization was conducted for 2 h, and a resulting product was cooled to 40° C. to obtain a modified acrylic resin.

Example 3

2 mol of maleic anhydride was slowly added in 1 mol of N,N'-bis(2-hydroxyethyl)ethylenediamine in 10 batches, mixed well by stirring, subjected to acylation at 60° C. for 6 h to obtain a modifier (an acylation product was shown in formula 1-3);

600 kg of distilled water and 5 kg of the modifier were added to a reaction device, and heated to 90° C. to obtain a modifier solution;

100 kg of acrylic acid, 2 kg of trimethylolpropane trimethacrylate, and 0.2 kg of N,N'-methylenebisacrylamide were uniformly mixed by stirring, and a resulting acrylic acid-crosslinking agent mixture was added into a head tank 1;

30 kg of an ammonium persulfate aqueous solution with a concentration of 20 wt % was added to a head tank 2; and the acrylic acid-crosslinking agent mixture in the head tank 1 and the sodium persulfate aqueous solution in the head tank 2 were added dropwise into the modifier solution within 6 h at the same time, polymerization was conducted for 2 h, and a resulting product was cooled to 40° C. to obtain a modified acrylic resin.

Example 4

1 mol of maleic anhydride was slowly added in 1 mol of N,N'-bis(2-hydroxyethyl)ethylenediamine in 6 batches, mixed well by stirring, subjected to acylation at 55° C. for 5 h to obtain a modifier (an acylation reaction product was shown in formula 1-2);

500 kg of distilled water and 10 kg of the modifier were added to a reaction device, and heated to 85° C. to obtain a modifier solution;

100 kg of acrylic acid, 1 kg of trimethylolpropane trimethacrylate, and 0.3 kg of N,N'-methylenebisacrylamide were uniformly mixed by stirring, and a resulting acrylic acid-crosslinking agent mixture was added into a head tank 1;

15 kg of a sodium persulfate aqueous solution with a concentration of 20 wt % was added to a head tank 2; and the acrylic acid-crosslinking agent mixture in the head tank 1 and the sodium persulfate aqueous solution in the head tank 2 were added dropwise into the modifier solution within 4 h at the same time, polymerization was conducted for 2 h, and a resulting product was cooled to 40° C. to obtain a modified acrylic resin.

Example 5

1 mol of maleic anhydride was slowly added in 1 mol of N,N-bis(2-hydroxyethyl)ethylenediamine in 5 batches, mixed well by stirring, subjected to acylation at 70° C. for 3 h to obtain a modifier (an acylation reaction product was shown in formula 1-4);

200 kg of distilled water and 5 kg of the modifier were added to a reaction device, and heated to 87° C. to obtain a modifier solution;

100 kg of acrylic acid and 4 kg of trimethylolpropane trimethacrylate were uniformly mixed by stirring, and a resulting acrylic acid-crosslinking agent mixture was added into a head tank 1;

18 kg of an potassium persulfate aqueous solution with a concentration of 20 wt % was added to a head tank 2; and the acrylic acid-crosslinking agent mixture in the head tank 1 and the sodium persulfate aqueous solution in the head tank 2 were added dropwise into the modifier solution within 3 h at the same time, polymerization was conducted for 3 h, and a resulting product was cooled to 40° C. to obtain a modified acrylic resin.

Example 6

1 mol of maleic anhydride was slowly added in 1 mol of N,N,N',N'-tetrahydroxyethylethylenediamine in 6 batches, mixed well by stirring, and then subjected to acylation at 50° C. for 4 h to obtain a modifier (an product was shown in formula 1-5).

400 kg of distilled water and 7 kg of the modifier were added to a reaction device, and heated to 90° C. to obtain a modifier solution;

100 kg of acrylic acid, 6 kg of trimethylolpropane trimethacrylate, and 0.3 kg of N,N'-methylenebisacrylamide were uniformly mixed by stirring, and a resulting acrylic acid-crosslinking agent mixture was added into a head tank 1;

15 kg of an ammonium persulfate aqueous solution with a concentration of 20 wt % was added to a head tank 2; and the acrylic acid-crosslinking agent mixture in the head tank 1 and the sodium persulfate aqueous solution in the head tank 2 were added dropwise into the modifier solution within 4 h at the same time, polymerization was conducted for 3 h, and a resulting product was cooled to 40° C. to obtain a modified acrylic resin.

Comparative Example 1

An acrylic resin-based retanning agent LEATAN AR (purchased from Qihe Lihou Chemical Co., Ltd.).

Use Example 7 pieces of samples (about 400 g each) from a same part of cowhide wet blue leather were separately added with 0.2% of a degreasing agent FB (Qihe Lihou Chemical Co., Ltd.) and 0.5% of oxalic acid, and rotated at 40° C. for 2 h. After removing water, water was replenished to 100%, and 4% of a chrome powder was added to allow retanning for 6 h. After removing water, 1.2% of baking soda and 1% of sodium formate were added to neutralize, followed by conducting retanning. In the retanning, 15% of a retanning agent (the retanning agent was selected from the modified acrylic resins prepared in Examples 1 to 6 and the acrylic resin-based retanning agent LEATAN AR provided in Comparative Example 1) was added separately, and then treated at 35° C. in a drum for 1.5 h, water was removed, a same amount of a general fatliquor BUXOM SS (Qihe Lihou Chemical Co., Ltd.) was added, treated in the drum at 50° C. for 1 h, and then 1.2% of formic acid was added to allow fixation (the formic acid was diluted with water three times a mass of the formic acid and then added in three batches with an interval of 10 min between each time). The above samples were taken out after washing with water, dried in vacuum at 70° C. and 100 kPa for 10 min, and tear resistance of the treated leather samples was tested. An electronic tensile testing machine WDW-50M was used for the testing, while resilience and grain side fineness were subjectively evaluated by tannery engineers. The results were shown in Table 2. The above mass percentages were based on a mass of the wet blue leather.

TABLE 2

Use effect of Examples 1 to 6 and Comparative Example 1

| Retanning agent | Tear resistance/N | Resilience | Dyeability | Grain side fineness |
|---|---|---|---|---|
| Example 1 | 74.71 | Relatively desirable | Bright-colored | Fine |
| Example 2 | 76.28 | Desirable | Bright-colored | Fine |
| Example 3 | 72.15 | Relatively desirable | Relatively bright-colored | Fine |
| Example 4 | 73.22 | Relatively desirable | Bright-colored | Fine |
| Example 5 | 73.61 | Desirable | Bright-colored | Fine |
| Example 6 | 74.35 | Relatively desirable | Relatively bright-colored | Fine |
| Comparative Example 1 | 68.33 | Acceptable | Mild discoloration | Relatively fine |

As shown in Table 1, the modified acrylic resin provided by the present disclosure as a retanning agent could improve the tear resistance, resilience, dyeing performance, and grain side fineness of leather.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A modified acrylic resin, formed from a mixture of, in parts by mass: 100 parts of acrylic acid, 5 parts to 60 parts of a modifier, 1 part to 30 parts of a crosslinking agent, 1 part to 30 parts of an initiator, and 200 parts to 600 parts of water; wherein said modifier comprises an acylate and/or a hyperbranched esterified polymer; wherein said acylate is formed by a first acylation of maleic anhydride with a first hydroxyl organic amine, said hyperbranched esterified polymer is formed by subjecting a second hydroxyl organic amine and maleic anhydride to a second acylation to obtain an acylate of the second acylation; and mixing the acylate of the second acylation with a catalyst to allow esterification, wherein said catalyst is one or more selected from the group consisting of p-toluenesulfonic acid, concentrated sulfuric acid, an immobilized liquid acid, an acidic oxide, a transition metal sulfide, a phosphate, a sulfate, a zeolite molecular sieve, a heteropolyacid, a cation exchange resin, a natural clay mineral, and a solid superacid;

said first hydroxyl organic amine and said second hydroxyl organic amine independently are one or more selected from the group consisting of N-(2-hydroxyethyl)ethylenediamine, N,N-bis(2-hydroxyethyl)ethylenediamine, N,N'-bis (2-hydroxyethyl)ethylenediamine, and N,N,N',N'-tetrahydroxyethylethylenediamine; and wherein the water, the modifier, the acrylic acid, the crosslinking agent, and the initiator are mixed and polymerized to obtain the modified acrylic resin.

2. The modified acrylic resin according to claim 1, wherein the first acylation and the second acylation independently are conducted at 40° C. to 90° C. for 1 h to 8 h.

3. The modified acrylic resin according to claim 1, wherein the esterification is conducted at 100° C. to 150° C. for 2 h to 5 h.

4. A preparation method of a modified acrylic resin, comprising the following steps:

preparing a modifier comprising an acylate and/or an hyperbranched esterified polymer; wherein said acylate is prepared by a first acylation of maleic anhydride with a first hydroxyl organic amine, and said hyperbranched esterified polymer is prepared by subjecting a second hydroxyl organic amine and the maleic anhydride to a second acylation to obtain an acylate of the second hydroxyl organic amine; and mixing the acylate of the second hydroxyl organic amine with a catalyst to allow esterification, wherein said catalyst is one or more selected from the group consisting of p-toluenesulfonic acid, concentrated sulfuric acid, an immobilized liquid acid, an acidic oxide, a transition metal sulfide, a phosphate, a sulfate, a zeolite molecular sieve, a heteropolyacid, a cation exchange resin, a natural clay mineral, and a solid superacid; and said first hydroxyl organic amine and said second hydroxyl organic amine independently are one or more selected from the group consisting of N-(2-hydroxyethyl) ethylenediamine, N,N-bis(2-hydroxyethyl)ethylenediamine, N,N'-bis(2-hydroxyethyl)ethylenediamine, and N,N,N',N'-tetrahydroxyethylethylenediamine mixing water, the modifier, acrylic acid, a crosslinking agent, and an initiator to obtain a mixture, wherein the mixture is consisted of, in parts by mass: 100 parts of the acrylic acid, 5 parts to 60 parts of the modifier, 1 part to 30 parts of the crosslinking agent, 1 part to 30 parts of the initiator, and 200 parts to 600 parts of the water; and polymerizing said mixture to obtain the modified acrylic resin.

5. The preparation method according to claim 4, wherein the first acylation and the second acylation independently are conducted at 40° C. to 90° C. for 1 h to 8 h.

6. The preparation method according to claim 4, wherein the esterification is conducted at 100° C. to 150° C. for 2 h to 5 h.

7. The preparation method according to claim 4, wherein the polymerizing is conducted at 80° C. to 90° C. for 2 h to 10 h.

8. The preparation method according to claim 5, wherein the polymerizing is conducted at 80° C. to 90° C. for 2 h to 10 h.

9. The preparation method according to claim 6, wherein the polymerizing is conducted at 80° C. to 90° C. for 2 h to 10 h.

* * * * *